Inventor
Frederick A. Schick
Attorney

Oct. 4, 1960   F. A. SCHICK   2,954,858
MULTIPLE DISK CLUTCH
Filed Oct. 4, 1957   2 Sheets-Sheet 2

Inventor
Frederick A. Schick
by
Attorney

United States Patent Office 2,954,858
Patented Oct. 4, 1960

2,954,858
MULTIPLE DISK CLUTCH
Frederick A. Schick, Springfield, Ill., assignor to Allis-Chalmers Manufacturing Company, Milwaukee, Wis.

Filed Oct. 4, 1957, Ser. No. 688,238

7 Claims. (Cl. 192—69)

This invention pertains to a multiple disk type clutch assembly for transmitting torque between a driving and driven member and is more particularly concerned with an improved clutch disk structure to be installed in said assembly.

The efficiency of a multiple disk clutch can be expressed as a ratio of the amount of torque the clutch will pick up while engaging (pickup capacity) to the amount of torque the clutch will carry or transmit while engaged.

Since the amount of torque a clutch will carry is constant, the efficiency can be improved by increasing the pickup capacity of the clutch. In order to transmit the full power of an engine through a multiple disk type clutch a sufficiently large torque transmitting surface area must be brought into intimate frictional contact during engagement of the clutch, and to provide a clutch with a satisfactory starting or pickup capacity this area must be brought into contact as smoothly and rapidly as possible. Heretofore the multiple disk clutches of the type which are adapted to be used for steering crawler tractors have not been entirely satisfactory from the standpoint of efficiency. It is a well known phenomenon that this type of clutch will carry a substantially larger torque when engaged than it can pick up while engaging. One of the principal reasons for the poor pickup capacity is due to the fact that part of the spring force which is applied in order to bring the disk pairs into torque transmitting engagement is resisted by the drag force due to friction between the teeth on the sets of clutch disks and the splines or keys on the driving and driven drums as the disks are moved into engagement while under a torsional load. The result of this drag force is that all of the disk pairs of the multiple disk clutch do not carry an equal share of the torque load which is to be transmitted. It has been found that the amount of torque carried by the disk pairs decreases inversely as their distance increases from the face of the stack from which the spring pressure is applied. It will be readily seen that this is so because of the accumulative effect of the frictional resistance offered by each of the disks as the spring force is transmitted through the stack plus the increased amount of friction between the keys and the teeth of the disks which are beginning to carry a portion of the torque load. An additional consequence of this is that since the disk pairs at the front of the stack are initially subjected to a greater amount of pressure, they are engaged or brought into intimate contact sooner. As the torque load is applied to only the engaged disks at the front of the stack, considerable slippage between the contact surfaces occurs until such time as all of the disks are engaged, thereby causing excessive wear while the disk pairs near the rear end of the stack show comparatively little wear. In a crawler tractor the steering clutches are subjected to frequent manipulation, and excessive slippage is undesirable from the standpoint of poor efficiency as well as costly maintenance.

It is, therefore, the principal object of this invention to provide an improved multiple disk clutch assembly which will overcome the difficulties hereinbefore described in an entirely satisfactory manner.

It is a more specific object of this invention to provide an improved clutch disk structure which when inserted into a disk type clutch assembly will be operative to effectively urge the friction bound disks into torque transmitting contact during engagement so as to improve the efficiency of the clutch.

Another object of the invention is to provide an improved disk for a multiple disk type clutch having a camming portion on one of its axial faces which is operative during engagement to induce a wobble action so as to urge the friction bound disks to move axially into intimate torque transmitting contact thereby resulting in a clutch of improved pickup capacity.

It is a further object of this invention to provide a disk for a multiple disk type clutch exhibiting a wedge shaped cross section which is to be so placed within the stack of conventional disks so that when slipping occurs therebetween during engagement of the clutch, said wedge shaped disk will by a camming action tend to urge the friction bound disks into intimate torque transmitting contact thereby producing a clutch of improved pickup capacity.

These and other objects and advantages of the invention will become apparent when the following description is read in conjunction with the annexed drawings in which.

Figure 1:
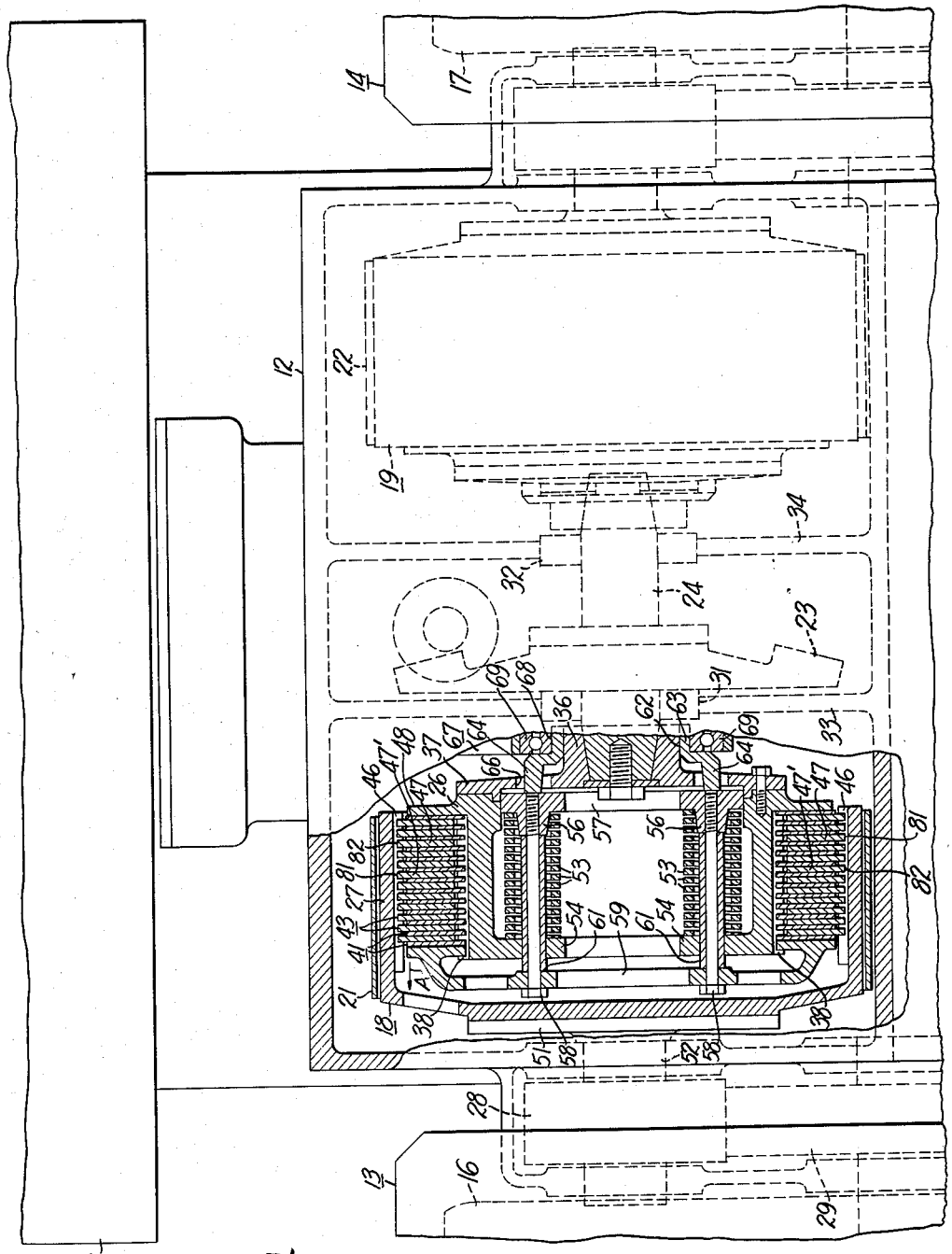
Fig. 1 is a partial end view of a crawler tractor showing the final drive housing having a portion thereof cut away to show a view in vertical section of one of the steering clutch assemblies.

Referring to Fig. 1, for the purposes of illustrating the present invention a multiple disk type steering clutch for a conventional type crawler tractor 11 has been selected in which the drive of the traction devices is controlled without the use of a differential. Since the construction of crawler tractors is well known, it is believed necessary to show only the rear or final drive housing structure 12 of the main frame in which a pair of endless track belts indicated generally at 13 and 14 are mounted in driven relation on drive sprockets, the latter being indicated at 16 and 17. The steering of the tractor is controlled by a pair of steering clutches 18 and 19 and a pair of supplemental brakes 21 and 22 which are in turn controlled in conformity with conventional practice. For straight ahead driving both of the steering clutches 18 and 19 are fully engaged and the supplemental brakes 21 and 22 are released so that both of the drive sprockets 16 and 17 may be rotated in unison by the driving torque of the engine. Torque is transmitted from the engine in the well known manner through a master clutch, propeller shaft, a suitable change speed transmission (none of which are shown) and through a bevel gear 23 to the cross shaft 24. (The endless track mechanisms at opposite sides of the main frame and the steering clutches 18 and 19 operative to control the track mechanisms are identical; and, therefore, it will be necessary to illustrate the structural detail of only one of the steering clutch units.) The cross shaft 24 which carries the driving drum 26 of steering clutch 18 then transmits the torque through the driving drum 26 through the stack of clutch disks and through the driven drum 27 of the steering clutch to the final drive pinion 28 which is permanently meshed to the drive sprocket 16 through suitable gearing as indicated at 29. Cross shaft 24 is journaled on suitable bearings 31 and 32 in aligned openings provided in partitions 33 and 34 of the rear housing 12 and carries bevel gear 23 which is keyed thereon. The driving hub 36 is nonrotatably mounted on one end of cross shaft 24. The driving drum 26 of the steering clutch 18 is bolted to the radial flange 37 of hub 36. A series of axially extending splines or keys 38 are formed circumferentially on the outside surface of drum 26. The driving drum 26 carries a set or series of clutch disks comprising a plurality of single metallic disks 41 having a series of internal teeth 42 (shown best in Fig. 6) which are drivingly engaged by the keys or splines 38. Surrounding driving drum 26 and disks 41 is a driven drum 27 which carries a set of clutch disks comprising a plurality of single friction disks 43 which have external teeth 44 (best shown in Fig. 2) which are drivingly engaged by axially extending keys or splines 46 which are formed circumferentially on the inside surface of the driven drum 27. The series of disks carried on drum 27 also include a pair of specially constructed disks 47 and 47' whose structure and function will be further described below. The friction disks 43 (including disks 47 and 47') are stacked alternately with the metallic driving disks 41. A flange 48 is formed on the driving drum 26 to afford an axial abutment for the stacked clutch disks 41, 43, 47 and 47'. Drum 27 is mounted on a flange 51 of the supporting shaft 52 for the final drive pinion 28 and a brake band 21 surrounds the drum 27 and may be tightened by a suitable mechanism for purposes of braking the endless track belt 13.

Axial pressure for compressing the stack of disks and maintaining them in torque transmitting engagement is supplied by a plurality of coiled compression springs 53 which are arranged circumferentially at the inside of the driving drum 26 and are seated axially against radially extending flange 54 and project toward the interior of the drum 26. The free ends of the coil springs 53 are seated on lugs 56 and bear against an axially floating throwout plate 57. Lugs 56 are radially disposed and rigidly connected on plate 57 in circumferentially spaced relationship. Plate 57 also carries a plurality of bolts 58 which are in threaded engagement with axially extending openings provided in lugs 56. Bolts 58 extend axially through the coil springs 53. A thrust plate 59 for exerting pressure upon the stacked disks 41, 43, 47 and 47' is mounted on bolts 58. Springs 53 are under considerable compression in order to effectively urge plate 57 in an axial direction toward the driving hub 36 thereby transmitting axial pressure to the thrust plate 59 through the bolts 58, the heads of which bear against plate 59. Tubular spacers 61 surround bolts 58 and are operatively interposed between the throwout plate 57 and thrust plate 59 for maintaining a predetermined axial distance therebetween. The driving hub 36 has a central sleeve portion 62 upon which is mounted a spider 63 which is axially shiftable thereon and has abutment arms 64 extending axially toward the floating ring through suitable openings 66 provided in flange 37 of driving hub 36. A yoke or throwout assembly indicated generally at 67 is mounted on the hub 68 of spider 63 by means of a suitable bearing member indicated at 69 and is operative to move spider 63 in an axial direction to disengage the stacked clutch disks 41, 43, 47 and 47'.

When the yoke assembly 67 is moved to the left by suitable control linkages not shown, it causes an axial shifting movement of the spider 63 toward the driving hub 36. The movement of spider 63 is transmitted through the arms 64 to the plate 57 which is in turn transmitted to the thrust plate 59 through the tubular spacers 61 causing movement of plate 59 in the direction of arrow A. The pressure applied to the spider 63 must be sufficiently strong to overcome the force of the coil springs 53 subjecting them to further compression. As the thrust plate 59 is moved to the left in the direction of arrow A, the stacked clutch disks 41, 43, 47 and 47' which are normally subjected to axial compression in a direction opposite to arrow A by the initial tension of the compression springs are thus released from intimate frictional engagement with each other.

Figure 2:
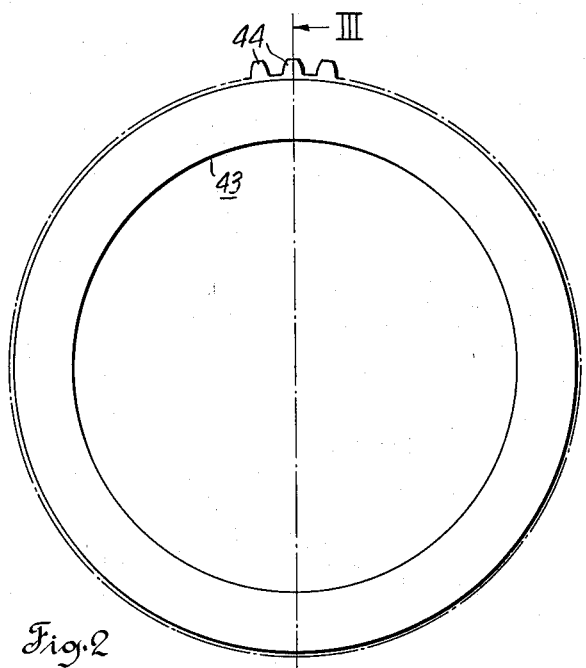
Fig. 2 shows the front view of a friction disk of the type that is associated with the driven member of a multiple disk clutch.
Figures 3, 4, 5:
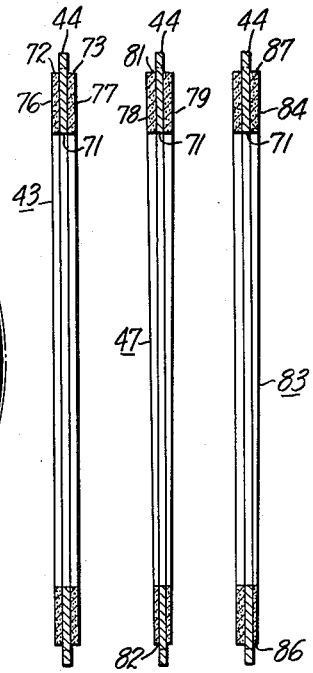
Fig. 3 shows a sectional view of a standard friction disk taken along section line III—III in Fig. 2.
Fig. 4 is a sectional view similar to Fig. 3 showing a tapered friction disk having both faces respectively being disposed in a plane extending transversely of and at an oblique angle to the center axis of the disk which is the preferred embodiment.
Fig. 5 is a sectional view similar to Fig. 3 showing a tapered friction disk having one face disposed in a plane extending transversely of and at an oblique angle to the center axis of the disk.

Referring to Figs. 2 and 3, a standard friction disk 43 is of uniform thickness and comprises an annular metallic body 71 having a pair of annular clutch facings 72 and 73 molded on opposite axial sides thereof. The facings may be of any suitable type facing material. A series of teeth 44 are formed on the outer periphery of body 71 and extend circumferentially thereabout. Teeth 44 are to be drivingly engaged with keys 46 on the driven drum 27. The disk 43 presents a pair of radially extending faces or contact surfaces 76 and 77 at opposite axial sides respectively. Faces 76 and 77 are to be in intimate frictional contact with corresponding faces of adjacent metallic clutch disks 41 during engagement of the clutch.

Referring to Fig. 4, a tapered friction disk 47 is identical to disk 43 except that the contact surfaces or faces 78 and 79 are respectively disposed in a plane extending transversely of and at an oblique angle to the center axis of the disk so that the point of maximum axial distance between faces 78 and 79 or thickest portion which is indicated at 81 is located diametrically opposite of or a circumferential distance of 180° from the portion 82 of thinnest width or minimum axial distance between faces 78 and 79. This taper may be obtained by grinding the faces of a standard type disk on a flat plane with approximately equal amounts of material being removed from each face so that the thinnest portion 82 is approximately .030 of an inch thinner than the thickest portion 81. It is not intended, however, to limit the invention as to method or dimensions.

Referring to Fig. 5, a tapered friction disk 83 is identical in construction to disk 43 except that only the one face 84 is disposed in a plane extending transversely of and at an oblique angle to the center axis of the disk. The taper of disk 83 may be obtained in a manner similar to that described for disk 47. The amount of taper is such that the thinnest portion 86 of disk 83 is approximately .015 of an inch thinner than the thickest portion 87. Again, however, it should be understood that it is not intended to limit the invention as to method or dimensions. Disk 83 represents a second embodiment and may be used with or in place of disk 47 to carry out the invention.

Figure 6:
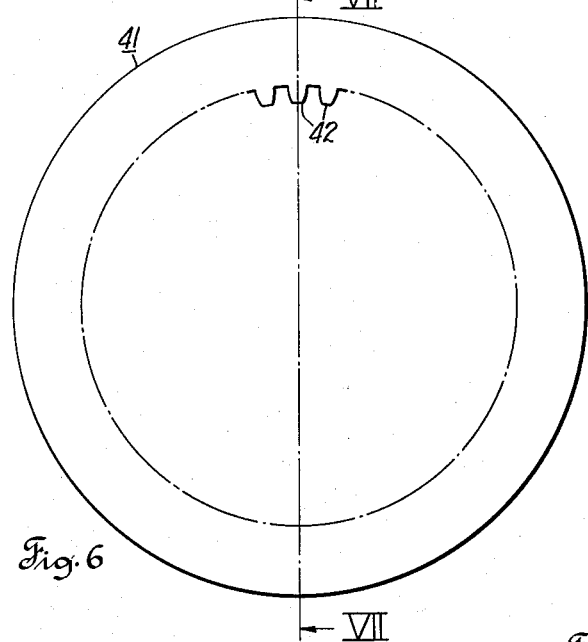
Fig. 6 shows the front view of a clutch disk of the type to be associated with the driving member of a multiple disk clutch assembly.
Figures 7, 8, 9:
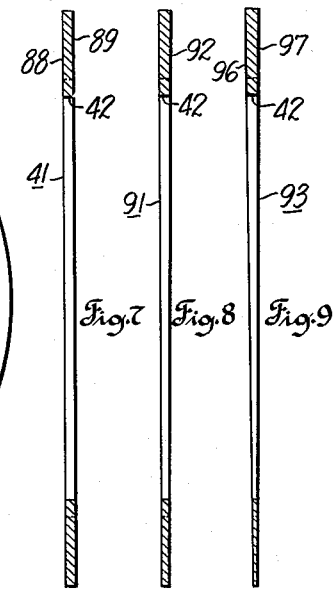
Fig. 7 is a sectional view taken along line VII—VII of Fig. 6 showing the cross section of a standard metallic disk.
Fig. 8 shows a sectional view similar to Fig. 7 which illustrates a tapered clutch disk having one face disposed in a plane extending transversely of and at an oblique angle to the center axis of the disk.
Fig. 9 shows a sectional view similar to Fig. 7 showing a tapered clutch disk having both faces sloping diametrically.

Referring to Figs. 6 and 7, a standard annular metallic disk 41 is of conventional construction being of uniform axial thickness and having teeth 42 formed on and extending circumferentially about the inner periphery thereof. Teeth 42 are engageable with the keys 38 of the driving drum 26. The disk 41 includes radially disposed opposite faces 88 and 89 which are engageable respectively with the adjacent faces of disks 43.

Referring to Fig. 8, a tapered disk 91 is the same as 41 except that face 92 is disposed in a plane extending transversely of and at an oblique angle to the center axis of the disk similar to face 84 of disk 83 of Fig. 5. Disk 91 represents a third embodiment to be inserted into the stack in place of a disk 41 to carry out the invention.

Referring to Fig. 9, the tapered disk 93 is of the same type as disk 41 except that both faces 96 and 97 are disposed in a plane extending transversely of and at an oblique angle to the center axis of the disk being similar to faces 78 and 79 of disk 47 shown in Fig. 4. Disk 93 represents a fourth embodiment and may be inserted into the stack in place of a disk 41 to carry out the invention.

In the preferred embodiment of the invention it has been found that a pair of disks 47 and 47' are located in spaced relationship in the stack of clutch disks 43. Disk 47' is of exactly the same construction as disk 47. Referring to Fig. 1, the exact location of disks 47 and 47' in the stack of disks 41 and 43 is a follows: starting at the bottom of the stack next to hub 36 install a standard metallic disk 41, then a friction disk 43, then another metallic disk 41, then a disk 43 and another metallic disk 41. The third friction disk should be a tapered disk 47 which has sloping faces 78 and 79. Continuing in the usual manner next to special friction disk 47 is installed a disk 41, then a disk 43, and so on to the sixth friction disk. In this position install the second special friction disk 47' so that the thickest portion 81 is located diametrically opposite of or 180° circumferentially from the thick portion 81 of the other special disk 47. In this position the thin portion 82 of disk 47 is axially opposite from thick portion 81 of disk 47' in order to maintain plate 59 square with the axis of the drums 26 and 27. It is not intended, however, to limit the invention to the embodiment just described since any combination of one or more of disks 47, 83, 91 or 93 can be arranged in spaced relation from each other so as to improve the operation of the clutch assembly 18.

*Operation*

Referring to Fig. 2, during disengagement of the steering clutch assembly 18 the thrust plate 59 is moved in the direction of the arrow A, and the driving drum 26 and the series of disks 41 are free to rotate with respect to the driven drum 27 together with the series of disks 43 (including disks 47 and 47'). To engage the clutch assembly 18, the yoke assembly 67 is moved to the right allowing the compression springs 53 to act upon the thrust plate 59 urging the latter in an axial direction opposite to the arrow A. As the thrust plate 59 bear against the end of the stack, those disks 41 and 43 immediately adjacent the thrust plate are urged into contact with each other. Unitil such time as a sufficient number of the disks are brought into frictional contact with each other so as to transmit the required full amount of torque, the driving drum 26 will continue to rotate with respect to driven drum 27 and the faces of disks 41 will tend to slip past the faces of disks 43 with which they are engaged.

During the engagement of the clutch assembly in order to effectively urge the disks into intimate contact by moving the thrust plate 59 toward the hub 36, it is necessary for the springs 53 to overcome any friction between the teeth 42 and 44 of disks 41 and 43, respectively, on the corresponding keys 38 and 46. The sum of the accumulative effect of the friction between the teeth and the keys as an increased number of the disks are being moved plus the increased amount of friction between the keys and teeth of the disk, which are first to become engaged and are beginning to carry a portion of the torque, reaches such a magnitude that it will nearly equal the effective force of springs 53 before the disks at the end of stack (nearest flange 48) can be brought into intimate frictional contact with each other. Further movement of plate 59 is thus prevented and only the disks at the front of the stack carry their full portion of the torsional load to be transmitted. It will be readily seen that while engaging with only a portion of the clutch disks carrying their full proportion of the entire torque, the full engine power cannot be transmitted from the driving drum 26 to the driven drum 27 because the faces of the engaged disks 41 and 43 do not present a sufficient contact area and will, therefore, continue to slip past each other. According to the applicant's invention, however, as the disks continue to slip past each other, the thick portion 81 of the disks 47 and 47' acts as a cam on the flat surface of the adjacent nontapered disk; and as either disk 47 or 47' tends to slip, a wobble action or irregular axial motion is imparted to the friction bound disks of the stack tending to push or kick them in an axial direction toward the hub 36 and thereby allow further axial movement of plate 59 in the direction of hub 36 in order to maintain all of the disks in intimate frictional contact with each other.

It is to be understood that this invention is not intended to be limited to the number of tapered disks used or their location in the stack of a multiple disk clutch since even a single disk of the type described would produce an improved result.

It should be understood also that it is not intended that this invention be limited to a diametrically tapered disk as the invention contemplates a disk provided with a camming portion which is effective to impart axial movement to adjacent disks in order to facilitate engagement of the clutch. Also the term "tapered disk" as used herein and in the claims contemplates a disk of the character described having opposite faces disposed in planes oblique to the center axis of the disk but at the same time does not necessarily have the thinnest portion of the disk positioned diametrically opposite from the thickest portion of the disk.

It will be apparent from the drawings and the foregoing detailed description that a novel construction and design for a clutch disk has been illustrated and described which will provide a multiple disk type clutch that will overcome the disadvantages inherent in the conventional devices.

Further, it should be understood that it is not intended to limit the patent granted hereon otherwise than is necessitated by the scope of the appended claims.

What is claimed is:

1. An annular disk for a multiple disk type clutch, said disk having an axis and a radially extending face on opposite axial sides thereof for engagement with surfaces of adjacent disks of the clutch, both of said faces being disposed in a plane extending transversely of and at an oblique angle to said axis to define a tapered disk having a portion of maximum axial distance and a portion of minimum axial distance between said faces, said maximum portion being disposed diametrically opposite from the minimum portion.

2. A multiple disk type clutch assembly comprising: a support; a driving member; a driven member, one of said members being disposed in axial overlapping relationship to the other, and both of said members being mounted on said support for rotation about a common axis; a plurality of alternately stacked driving and driven disks having common center axes, means mounting said disks for rotation with and for axial adjustment on said driving and driven members, respectively; a radially extending face at opposite axial sides of each of said disks, one of said faces of one of said disks being disposed in a plane extending transversely of and at an oblique angle to the center axis of the disk to define a tapered disk; a second disk adjacent said one disk, a face of said second disk disposed in a plane extending transversely of and at a right angle to the center axis of the disk, said last mentioned face being engageable with said one face of said tapered disk; and means associated with one of said members for exerting axial pressure to maintain said faces of said disks in frictional contact with each other.

3. A clutch assembly comprising: a support; a driving member; a driven member, said driven member being disposed in axial overlapping relationship to said driving member and both of said members being mounted on said support for rotation about a common axis; a first and second set of disks, each of said sets having a plurality of single disks alternately stacked with the single disks of the other of said sets, said disks having common center axes; means mounting said first set for rotation with and for axial adjustment on said driven member; means mounting said second set of disks for rotation with and for axial adjustment on said driving member; a radially extending face at opposite axial sides of each of said single disks, one of said faces respectively of a pair of single disks of said first set being disposed in a plane extending transversely of and at an oblique angle to the center axis of the disk to define a pair of tapered disks wherein the portion of maximum axial thickness of each disk is diametrically spaced from the portion of minimum axial thickness of said each disk, said pair of single disks being axially spaced from each other and so arranged on said driven member that said portion of maximum thickness of one of said pairs is located diametrically opposite from said portion of maximum thickness of the other of said pair; and means associated with said driving member for exerting axial pressure to maintain said two sets of disks in frictional contact with each other.

4. A friction disk for a multiple disk type clutch, said disk comprising an annular body disposed radially about an axis; a pair of annular facing members bonded respectively on opposite axial sides of said annular body; and radially disposed faces presented by each of said facing members for engagement with radially disposed surfaces of adjacent disks of the clutch, each of said faces being disposed in a plane extending transversely of and at an oblique angle to said axis to define a tapered disk having a thickest portion and a thinnest portion, said thickest portion being disposed diametrically opposite from the thinnest portion of said tapered disk.

5. In a multiple disk friction clutch assembly of the type having first and second mating sets of axially slidable annular disks having common center axes and being alternately stacked and carried respectively on a driving and a driven member, and means for axially compressing said sets of disks into torque transmitting engagement with each other, one of the axially slidable annular disks in one of said sets comprising: a radially extending contact surface formed on opposite axial sides thereof, one of said surfaces being disposed in a plane extending transversely of and at an oblique angle to the center axis of the disk to define a tapered disk wherein the maximum portion and the minimum portions of axial thickness of said tapered disk lie on a diameter line and at the periphery of said contact surfaces; and a disk of uniform thickness being positioned adjacent said tapered disk and having a surface coacting with said one surface of the tapered disk during compression of said sets of disks.

6. The combination set forth in claim 5 wherein said tapered disk is metallic and is provided with a series of internal teeth for engagement with the splines of one of said driving and driven members.

7. The combination set forth in claim 5 wherein a second tapered disk is provided which is similar to and of the same set as said one disk, said second disk being arranged in said clutch so that its portion of maximum axial thickness is located diametrically opposite from the portion of maximum axial thickness of said one disk.

References Cited in the file of this patent

UNITED STATES PATENTS

| | | |
|---|---|---|
| 1,340,885 | Fuller | May 25, 1920 |
| 1,407,384 | Crowley | Feb. 21, 1922 |
| 1,722,522 | Hahn | July 30, 1929 |
| 2,023,772 | Russo | Dec. 10, 1935 |
| 2,274,457 | Peets et al. | Feb. 24, 1942 |
| 2,632,543 | Wilson | Mar. 24, 1953 |